(12) United States Patent
Graichen et al.

(10) Patent No.: US 6,980,928 B1
(45) Date of Patent: Dec. 27, 2005

(54) SYSTEM AND METHOD FOR PROVIDING EFFICIENCY AND COST ANALYSIS DURING STEAM PATH AUDITS

(75) Inventors: Catherine Mary Graichen, Malta, NY (US); James Patrick Quaile, Burnt Hills, NY (US); William James Sumner, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 954 days.

(21) Appl. No.: 09/657,632

(22) Filed: Sep. 6, 2000

(51) Int. Cl.[7] ............................................. G06F 11/30
(52) U.S. Cl. ..................... 702/182; 702/182; 702/62; 702/184; 702/188; 700/111; 700/287; 700/291; 324/76.11; 73/112; 60/204; 705/412
(58) Field of Search ................................. 702/182–184, 702/188, 160, 62; 700/128, 111; 324/96, 324/76.11; 73/112; 60/378, 204; 705/412

(56) References Cited

U.S. PATENT DOCUMENTS

| | | | |
|---|---|---|---|
| 4,031,404 A * | 6/1977 | Martz et al. | 290/40 R |
| 4,297,848 A | 11/1981 | Silvestri, Jr. | |
| 4,891,948 A | 1/1990 | Kure-Jensen et al. | |
| 5,347,466 A | 9/1994 | Nicholas et al. | |
| 6,098,009 A | 8/2000 | Wettstein | |
| 6,102,958 A * | 8/2000 | Meystel et al. | 703/2 |
| 6,606,848 B1 * | 8/2003 | Rollins, III | 60/39.182 |
| 6,633,823 B2 * | 10/2003 | Bartone et al. | 702/57 |
| 6,670,810 B2 * | 12/2003 | Duncan et al. | 324/244.1 |
| 2002/0077711 A1 * | 6/2002 | Nixon et al. | 700/51 |
| 2002/0148222 A1 * | 10/2002 | Zaslavsky et al. | 60/398 |
| 2004/0024717 A1 * | 2/2004 | Sneeringer | 705/412 |

FOREIGN PATENT DOCUMENTS

| | | |
|---|---|---|
| DE | 19918332 | 10/2000 |
| GB | 23021238 A | 1/1997 |
| JP | 56141008 | 4/1981 |

OTHER PUBLICATIONS

King et al., ' Efficiency and Emissions: Cost Effective Modeling for Plant Performance Improvement', Mar. 1996, IEEE Publication, pp. 186-193.*

* cited by examiner

*Primary Examiner*—Marc S. Hoff
*Assistant Examiner*—Elias Desta
(74) *Attorney, Agent, or Firm*—Fletcher Yoder

(57) ABSTRACT

This disclosure describes a system and method for providing efficiency and cost analysis for a power generation unit. The system of this disclosure includes a current condition data acquisition logic that acquires a plurality of current condition variables for the power generation unit. A design constants acquisition logic acquires a plurality of design constants for the power generation unit; and an analysis logic calculates a operational efficiency of the power generation unit. The method provides efficiency and cost analysis for a power generation unit. The method includes the steps of acquiring a plurality of current condition variables for the power generation unit, and acquiring a plurality of design constants for said power generation unit. With the current condition variables and design constants, the method calculates an operational efficiency of the power generation unit.

22 Claims, 16 Drawing Sheets

US 6,980,928 B1

SYSTEM AND METHOD FOR PROVIDING EFFICIENCY AND COST ANALYSIS DURING STEAM PATH AUDITS

BACKGROUND OF THE INVENTION

This disclosure relates to the efficiency and cost analysis of power generation systems, and more specifically, describes a system and method to analyze the efficiency and impact on cost of steam-turbine operation during steam path audits.

Generally, estimating the efficiency and the impact on cost of the efficiency of a steam-turbine power generation system is a complicated, labor-intensive process. Typically, performance engineers visit power generation sites (i.e., sites using steam-turbine power generation) during scheduled outages to examine the condition of the steam turbines and to make recommendations for maintenance to improve the efficiency and lower the operating cost of the steam turbine. In order to improve the efficiency, and thus lower the operating cost of the steam turbine, performance engineers must calculate the efficiency of the steam turbine at each stage. Once the current efficiency factors are known at each stage, the performance engineer must use established guidelines and educated guesses as to what maintenance and/or repairs must be performed on each section of the turbine and determine the impact of the maintenance and/or repairs to the turbine's efficiency and the operating cost.

Since power generation sites may have limited budgets for maintenance, they may require several alternative proposals. At a minimum, they require a proposal in order to determine the cost-benefit equation. The engineer performing the audit must calculate the steam turbine efficiency from the measurement of clearances resulting from wear during the turbine operation and other changes in the turbine from its initial design condition. The effect of changes in these measurements require execution of engineering analysis programs to calculate the impact on the turbine efficiency. Preparing the input for the engineering analysis programs is frequently a time-consuming and error prone process.

The engineer performing the audit will typically prepare a detailed report for the power system site identifying the condition of the steam-turbine power generation system and making recommendations for maintenance and repairs. This report includes the engineer's observations and results from the engineering analysis performed to support the recommendations. Preparing the report, including formatting for printing, is a time-consuming process.

Traditionally, the reports for the power sites have been delivered as draft copies printed on paper from portable printers, followed by final copies printed from color printers and mailed from headquarters.

Thus, a heretofore unaddressed need exists in the industry to address the aforementioned deficiencies and inadequacies.

BRIEF SUMMARY OF THE INVENTION

This disclosure describes a system and method for providing efficiency and cost analysis of power generation systems operation. Briefly described, in architecture, the system can be implemented as follows. The system of this disclosure includes a current condition data acquisition logic that acquires a plurality of current condition variables for the power generation unit. A design constants acquisition logic acquires a plurality of design constants for the power generation unit; and an analysis logic calculates a operational efficiency of the power generation unit.

This disclosure can also be viewed as describing a method for providing for providing efficiency and cost analysis of power generation systems. In this regard, the method can be broadly summarized by the following steps: acquiring a plurality of current condition variables for the power generation unit, and acquiring a plurality of design constants for said power generation unit. With the current condition variables and design constants, the method calculates an operational efficiency of the power generation unit.

Other features and advantages of this disclosure will become apparent to one with skill in the art upon examination of the following drawings and detailed description. It is intended that all such additional features and advantages be included herein within the scope of the present invention.

BRIEF DESCRIPTION OF THE DRAWINGS

This disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
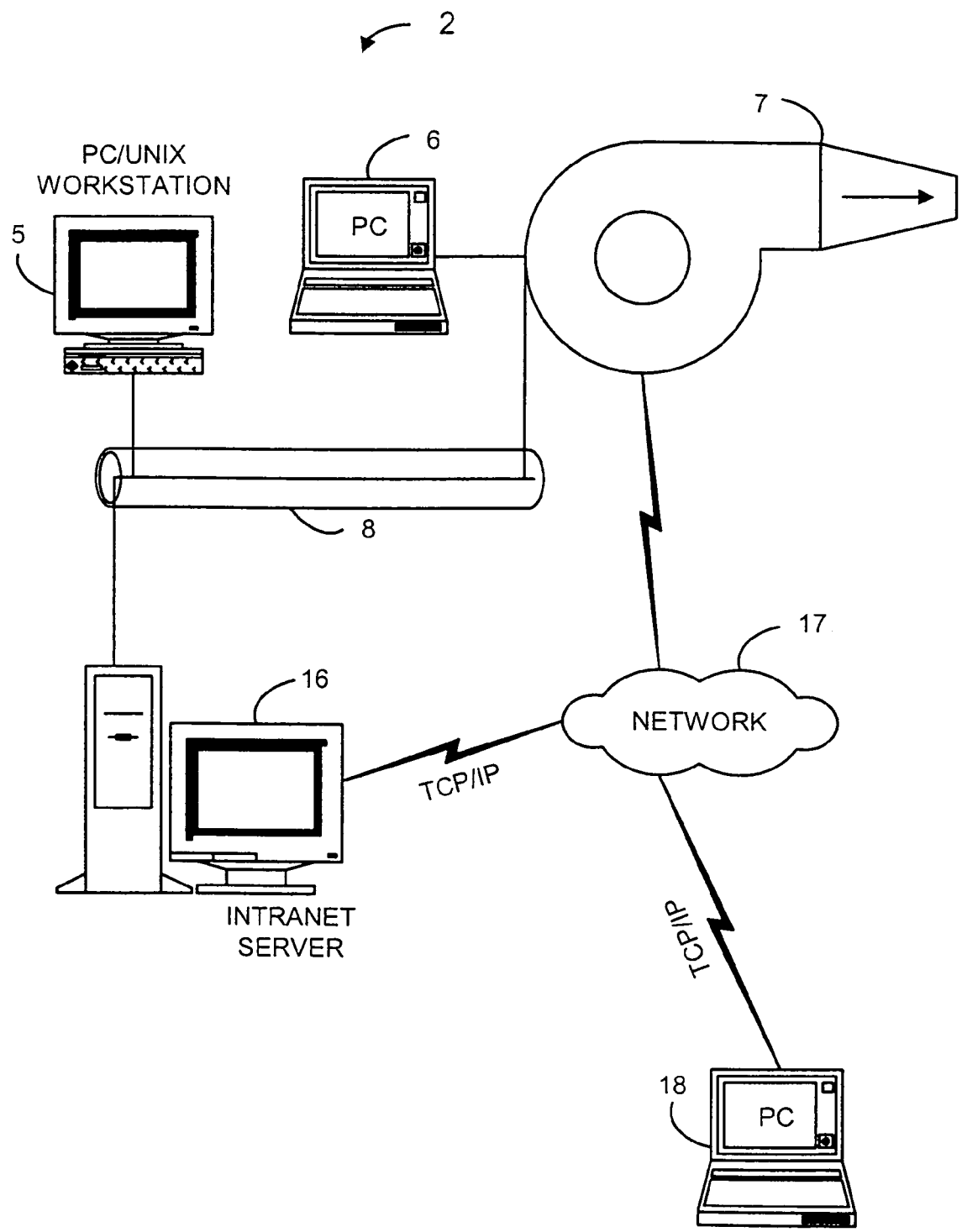
FIG. 1 is a block diagram illustrating an example of the configuration of the efficiency and cost analysis system of the present invention.

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

Turning now to the drawings, FIG. 1 is a block diagram of possible system configurations that illustrate the flexibility and platform independence of the efficiency and cost analysis system and method of the present invention. While the efficiency and cost analysis system configurations could take many forms, the diagram of FIG. 1 illustrates a plurality of computer systems 5, 6, 16 and 18 that may be connected to a power generation system 7 (i.e. steam turbine) either directly or by network. The network can be for example, but is not limited to, a dial-in, coaxial cable, Ethernet, LAN, WAN, PSTN, Intranet and/or Internet networks 8 and 17. Each of the computer systems in FIG. 1 are uniquely illustrated to emphasize that efficiency and cost analysis system may operate on diverse hardware platforms. In configurations where the steam-turbine power generation system 7 is not connected to a computer system, the engineer measures and inspects the turbine and physically records the results, which then are entered into the system manually or through data input files.

Figure 2:
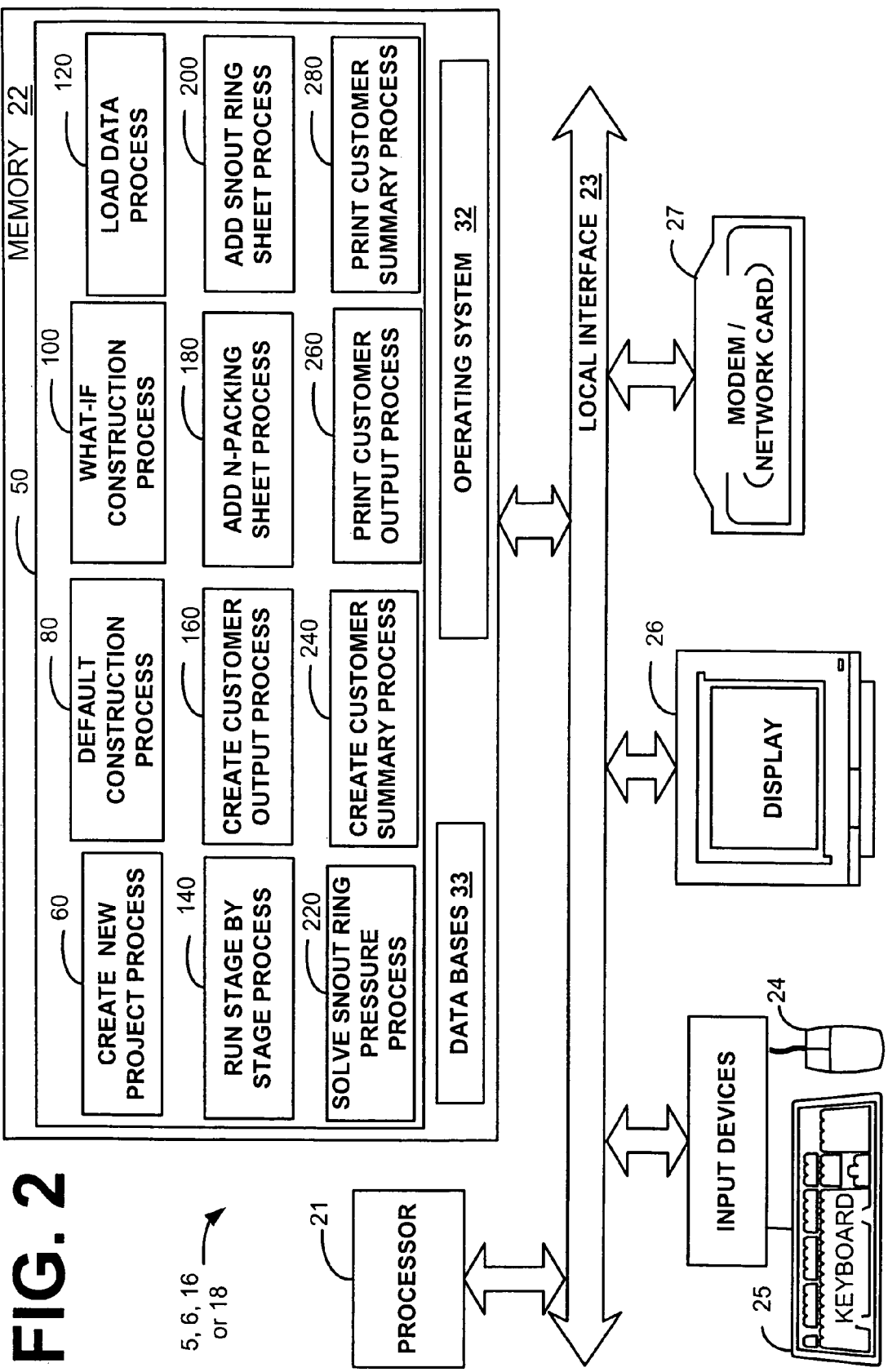
FIG. 2 is a block diagram of the efficiency and cost analysis system situated within a computer readable medium, within for example a computer system.

As illustrated in FIG. 2, the efficiency and cost analysis system 50 is shown residing in computer systems 5,6, 16 or 18. These computer systems 5,6, 16 or 18 generally comprises a processor 21 and memory 22 (e.g., RAM, ROM, hard disk, CD ROM, etc.) with an operating system 32. The processor 21 accepts code and data from the memory 31 over the local interface 23, for example, a bus(es). Direction from the user can be signaled by using input devices, for example but not limited to, a mouse 24 and a keyboard 25. The actions input and resulting output are displayed on the display terminal 26 or printer (not shown). An efficiency and cost analysis system 50 can access other computers and resources on a network utilizing modem or network card 27.

Also shown in FIG. 2 are the processes that comprise the efficiency and cost analysis system 50. The efficiency and cost analysis system 50 includes the following processes: create new project process 60, default construction process 80, what-if construction process 100, load data process 120, run stage by stage process 140, create customer output process 160, add N-packing sheet process 180, add snout ring sheet process 200, solve snout ring pressure process 220, create customer summary process 240, print customer output process 260 and print customer summary process 280 in memory area 22. Databases 33 are also shown to reside in memory area 22. These components are herein described in further detail with regard to FIGS. 2–15.

The memory area 22 can be, for example but not limited to, an electronic, magnetic, optical, electromagnetic, infrared, or semiconductor system, apparatus, device, or propagation medium. More specific examples (a non-exhaustive list) of the memory area 22 include any one or more of the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Figure 3:
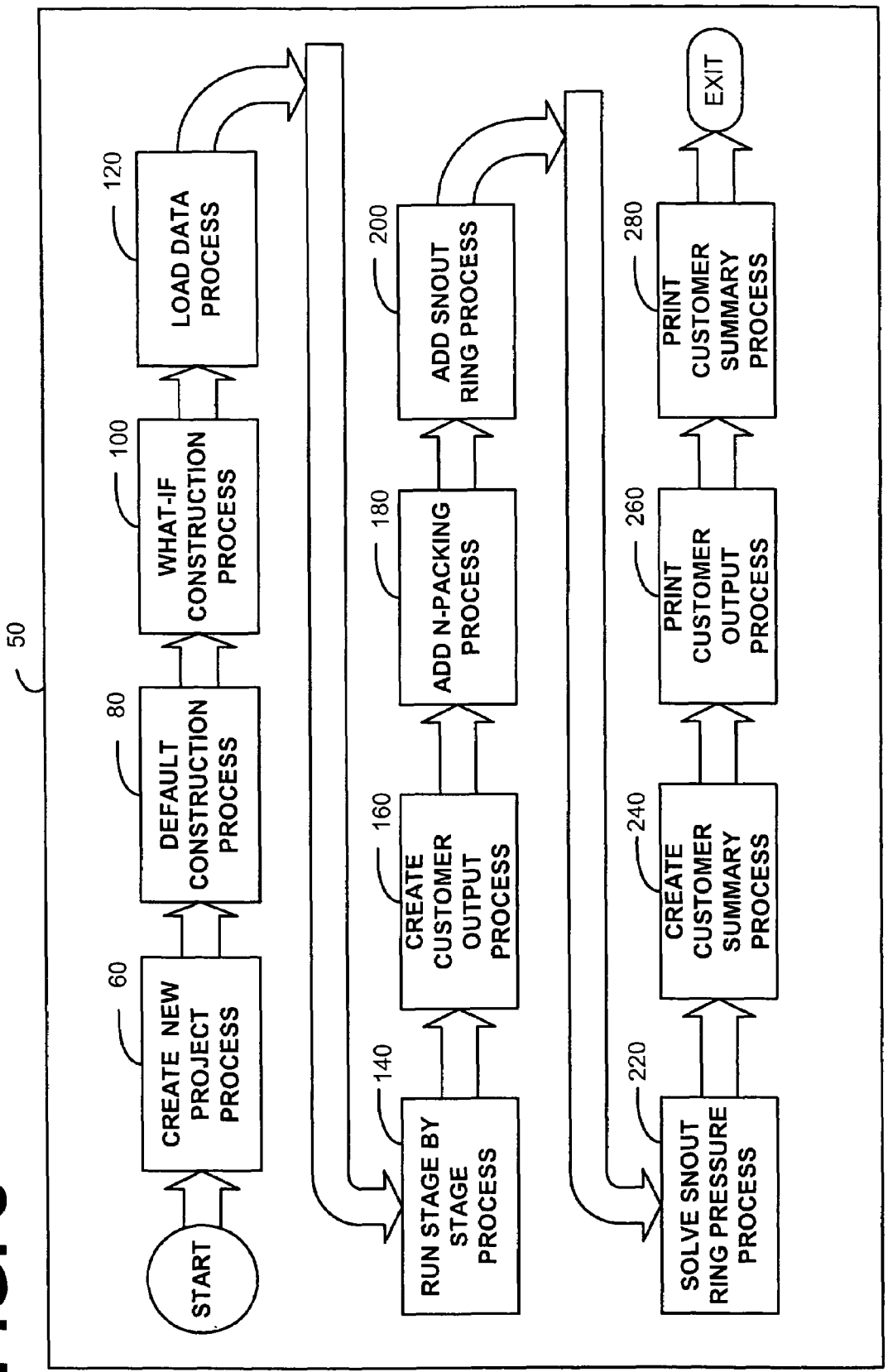
FIG. 3 is a flow chart illustrating an example of the process flow of the efficiency and cost analysis system and method of the present invention

Illustrated in FIG. 3 is a flow chart of an example of the efficiency and cost analysis system 50 of this disclosure. The efficiency and cost analysis system 50 provides the ability to each engineer to visit a customer steam-turbine power generation system to examine the steam turbines and recommend maintenance and replacement of parts and ways of improving the overall unit efficiency and cost of operation. The efficiency and cost analysis system 50 provides a performance engineer with the ability to perform data entry and compute efficiency and cost analysis of the steam turbine operation in a system that leads the performance engineer through the analysis process. First, the performance engineer creates a new project using the creates a new project process 60. The creates a new project process 60 enables the user to define the site variables of the steam turbine to be analyzed by the efficiency and cost analysis system 50 of this disclosure. The create a new project process 60 is herein defined in further detail with regard to FIG. 4.

Next, the efficiency and cost analysis system 50 performs the default construction process 80. This operation results in the construction of the interface to load the design parameters of the steam-turbine unit to be processed by the efficiency and cost analysis system 50. This operation also constructs the interface to collect data for the current condition and the condition of the steam-turbine unit after the proposed maintenance has been performed. The required input contains the values that are most likely to require a change from the default parameters. The default construction process 80 is herein defined in further detail with regard to FIG. 5.

The what-if construction process 100 is next performed. This step is performed if more than one combination of maintenance recommendations will be reported. The what-if construction process constructs the interface to collect additional data that are the most likely values that require a change from the original value specified in the default construction process for the additional maintenance configuration. The what-if construction process 100 is herein defined in further detail with regard to FIG. 6.

Next, the load data operation process 120 is performed. The load data process 120 loads the data for the design parameters of the steam-turbine unit. The load data process 120 allows the user to enter data that describes the current steam-turbine unit condition and the expected steam-turbine unit condition after repairs and maintenance. The load data operation process 120 is herein defined in further detail with regard to FIG. 7. Later, the run stage by stage process 140 is performed. This process generates the stage by stage input file for the selected group and selected stage data. The stage by stage process 140 is herein defined in further detail with regard to FIG. 8.

Next, the create customer output process 160 is performed. The create customer output process 160 allows the user to identify the states and sections of the steam-turbine unit to be compared. The create customer output process 160 is herein defined in further detail with regard to FIG. 9. Then, the add N-packing sheet process 180 is performed. The add N-packing sheet process 180 enables the user to identify the number of N-packings to be analyzed and provide input data for the selected number of N-packings. The add N-packing sheet process 180 is herein defined in further detail with regard to FIG. 10.

Next, the add snout ring process 200 is performed. The add snout ring process 200 allows the user to specify the number of snout ring valves and the maximum number of rings per valve, and input data for each valve specified. The add snout ring process 200 is herein defined in further detail with regard to FIG. 11. The solve snout ring pressure process 220 is then performed and computes the optimized intermediate pressures between each ring for each valve. The solve snout ring pressure process 220 is herein described in further detail with regard to FIG. 12.

The create customer summary process 240 enables the user to select the sections to be included in the customer summary output. The create customer summary process 240 is herein defined in further detail with regard to FIG. 13. The print customer output 260 provide the means for the user to select the comparison report and output printer, and select if an electronic version of the comparison report is to be created. The print customer output process 260 is herein defined in further detail with regard to FIG. 14. The final process performed by the efficiency and cost analysis system 50 is print customer summary process 280. The print customer summary process 280 allows the user to select the comparison summary report and printer for output and to indicate if an electronic version of the comparison summary report is to be created. The print customer summary process 280 is herein defined in further detail with regard to FIG. 15.

Figure 4:
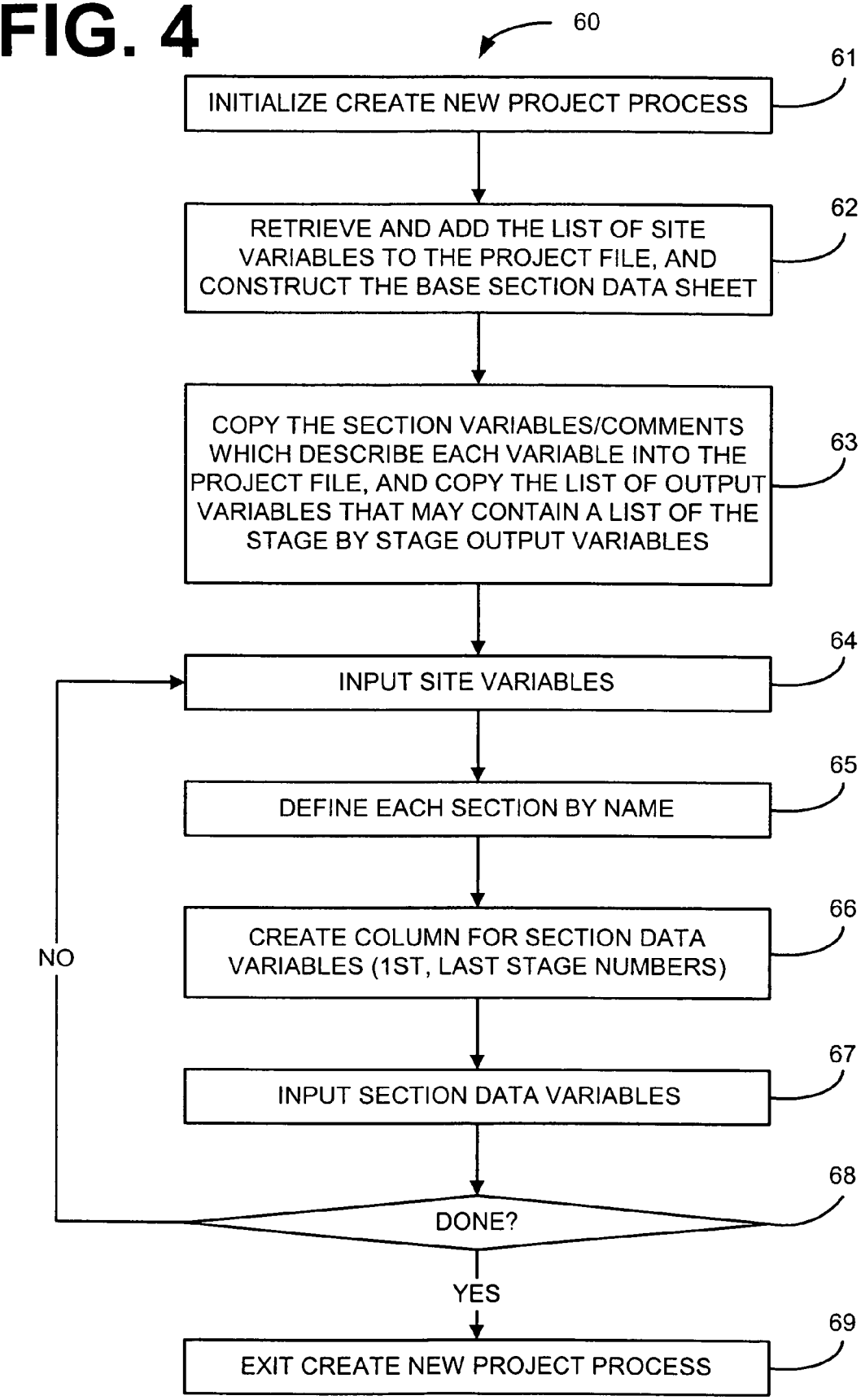
FIG. 4 is a flow chart illustrating an example of the process flow of the create new project process used in the system and method for efficiency and cost analysis of the present invention, as shown in FIG. 2 and FIG. 3.

Illustrated in FIG. 4 is a flow chart of an example of the create new project process 60 that can be utilized in the efficiency and cost analysis system 50 of this disclosure. The create new project process 60 is first initialized at step 61. This creates a new project file. At step 62, the create new project process 60 retrieves the list of site variables and adds them to the project file, so that the user may enter these associated values later at step 64. The create new project process 60 also constructs the base section data sheet at step 62. At step 63, the create new project process 60 copies the section variables and comments which describe each variable into the project file. The create new project process 60 also copies the list of output variables required to calculate the impact on overall and section efficiency at step 63. The output variables contain a list of the stage by stage output variables that will be extracted and stored in resulting work groups. The output variables also contain some results that apply to the entire section referred to as overall variables. Each variable indicates whether the values are stage specific or overall variables. The user may add additional variables to this work group before running the stage by stage process 140 herein defined with regard to FIG. 8, to retrieve additional values for the current project.

Next, the user is prompted to input site variables at step 64. These site variables include, but are not limited to, customer name and customer ID, fuel cost, overall parameters including turbine number, turbine kilowatt output, figure plant heat rate, capacity factor, cost factors, number of N-packing, number of valves, the max number of snout rings per valve, and the like.

Next, at step 65, the user is asked to define each section by name. At step 66, the create new project process 60 creates a column for section data variables for each section name that the user has defined. The section data variables include the first and last stage numbers that must be completed before constructing the base variables. The base section variables are the design values for a steam-turbine power generation unit. The base section variables include, but not limited to, rotations per minute, section bowl pressure, section bowl temperature, section bowl enthalpy, section exhaust pressure, section exhaust temperature, section exhaust enthalpy.

The stage numbers do not need to be unique between groups, so if two groups represent two flows for the same section, the numbers may be repeated. These numbers are input at step 67, which allows input of the section data variables. Other variables may be input by the user at this stage, or indicated if they will be loaded by reading a stage by stage input file from another source.

At step 68, the create new project process 60 determines whether there are more groups to be constructed. If there are more groups to be constructed, the create new project process 60 returns to repeat step 63 through 68. If there are no more groups to be constructed, the create new project process exits at step 69.

Figure 5:
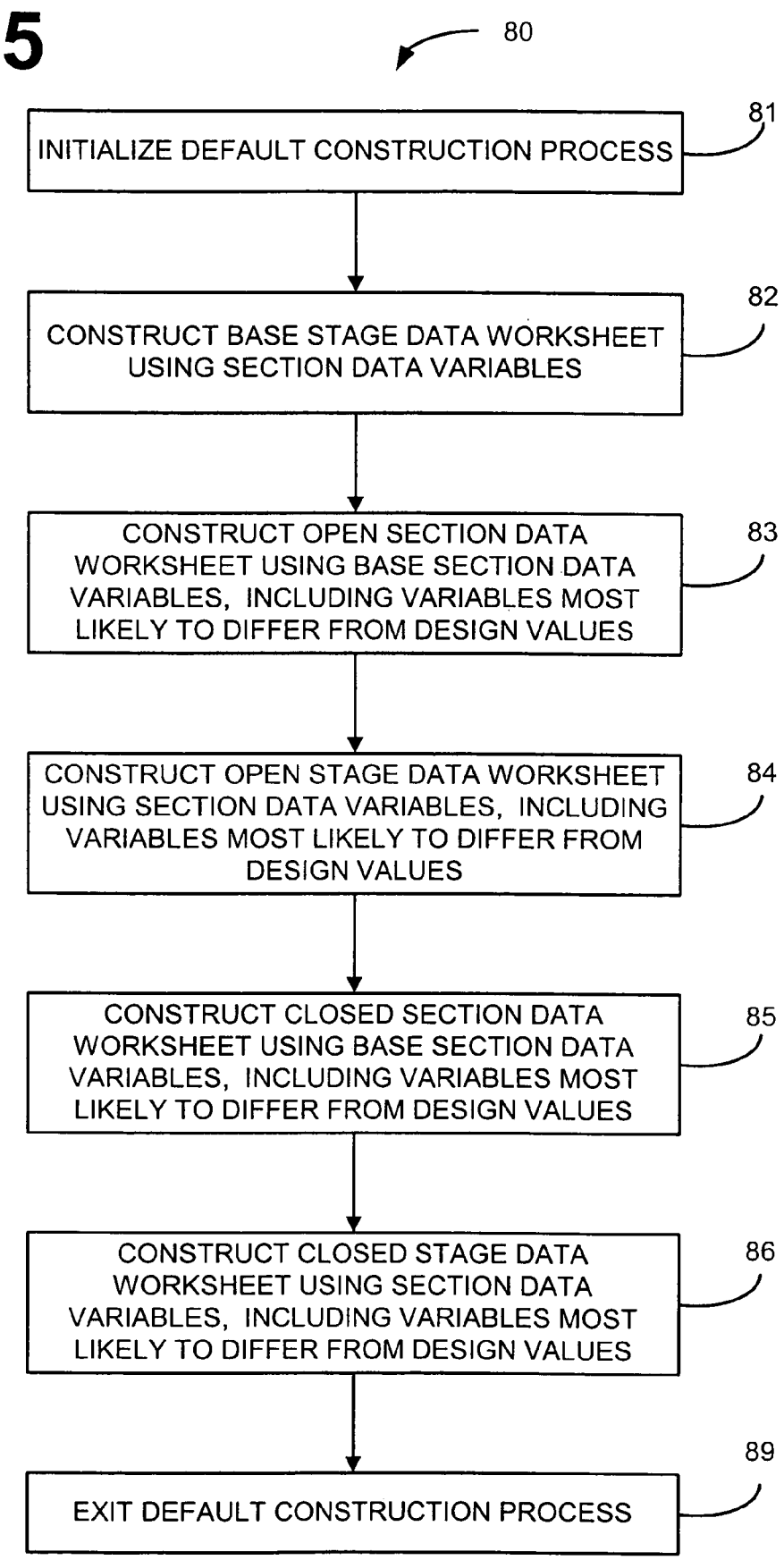
FIG. 5 is a flow chart illustrating an example of the default construction process used in the system and method for efficiency and cost analysis of the present invention, as shown in FIG. 2 and FIG. 3.

Illustrated in FIG. 5 is the default construction process 80 that can be utilized in the efficiency and cost analysis system 50 of this disclosure. First the default construction process 80 is initialized at step 81. Next, at step 82, the default construction process 80 constructs the base stage data work sheet using the section data variables defined in the create new project process 60 (FIG. 4). At step 82, the default construction process 80 also copies the input data parameters for all variables used in the analysis process to the base stage data work sheet, and then constructs a separate column for each stage in each group where the data for the variables may be entered by the user. The base stage data variables include, but are not limited to, stage flow, carryover type, stage type, nozzle parameters, bucket parameters, clearances and wheel hole parameters.

Next, in step 83, the default construction process 80 constructs the open section data worksheet using base section data variables. These base section data variables include the section variables most likely to differ from the design values of the device being analyzed by the efficiency and cost analysis system 50 of the present invention. The open section data variables most likely to differ from the design state include, but are not limited to section group pressure, section, group temperature, section group enthalpy, section exhaust pressure, section exhaust temperature, section exhaust enthalpy. At step 84, the default construction process 80 constructs the open stage data work sheet using section data variables, and copies the variables most likely to differ from the design value of the device being measured. The open stage data variables are the current variable values for a stage of the steam-turbine power generation unit. The open stage data variables most likely to differ from the design state include, but are not limited to, clearances, stage flow and correction factors for damage to nozzles and buckets.

The default construction process 80 also constructs a separate column for each stage in each group where the data for these variables may be entered by the user at step 84. Next, the default construction process 80 constructs the closed section data work sheet using base section data variables at step 85. These closed section data variables also include the section variables most likely to differ from design values. The closed section data variables are the optimum target variable values for a steam-turbine power generation unit. The closed section data variables most likely to differ from the design state include, but not limited to, section bowl pressure, section bowl temperature, section bowl enthalpy, section exhaust pressure, section exhaust temperature, section exhaust enthalpy.

At step 86, the construction of the closed stage data work sheet using the section data variables is performed. The closed stage data variables are the optimum target variable values for each stage of the steam-turbine power generation unit. The closed stage data variables most likely to differ from the design state include, but are not limited to, clearances, stage flow and correction factors for damage to nozzles and buckets. At this point, the default construction process 80 also copies the data variables most likely to differ from the design values, and then constructs a separate column for each stage in each group where the data for these variables may be entered by the user. The default construction process 80 then exits at step 89.

Figure 6:
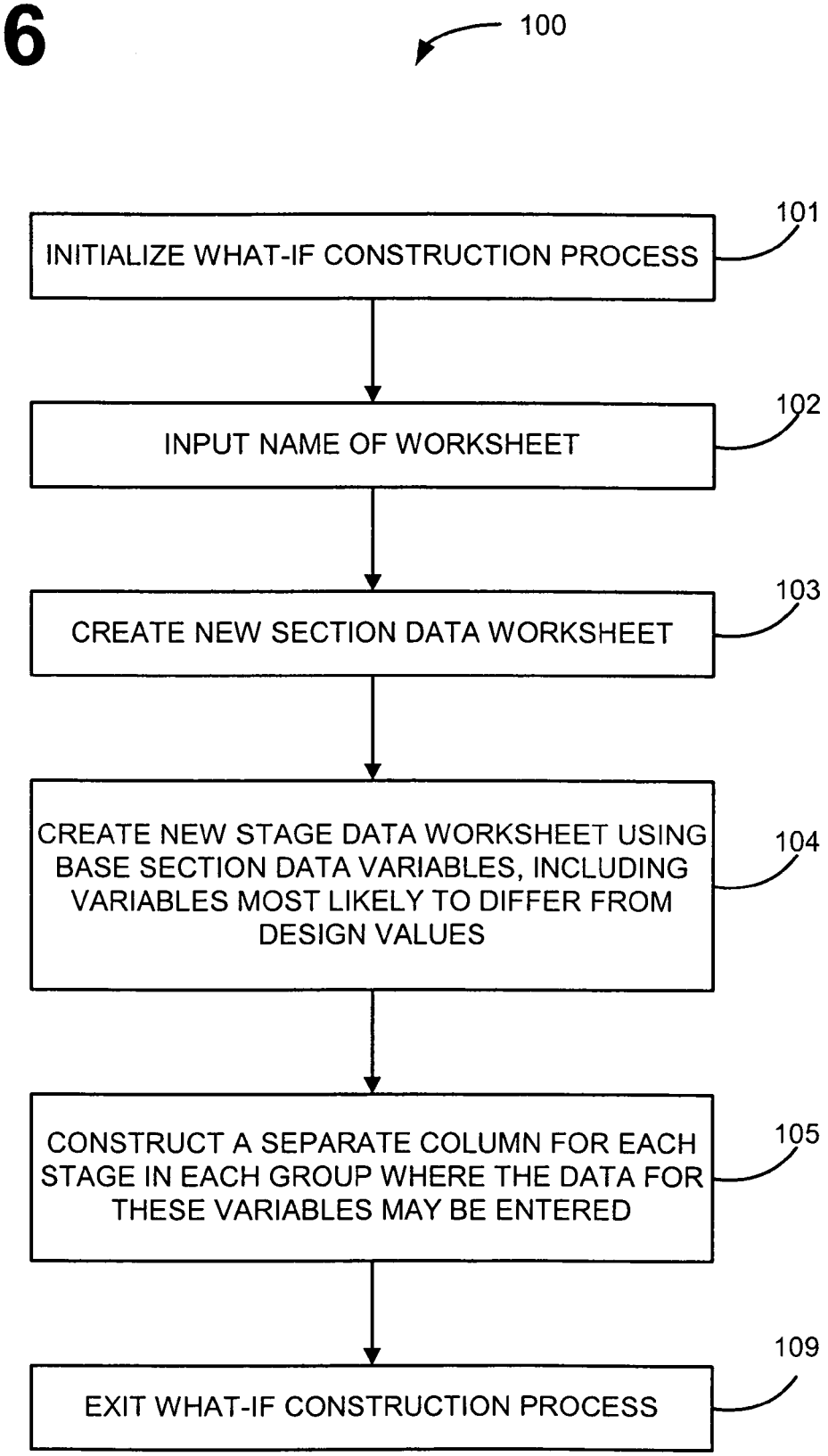
FIG. 6 is a flow chart of an example of what-if construction process used in the system and method for efficiency and cost analysis of the present invention, as shown in FIG. 2 and FIG. 3.

Illustrated in FIG. 6 is the what-if construction process 100 that can be utilized in the efficiency and cost analysis system 50 of this disclosure. The what-if construction process 100 allows the user to include data variables representative of different target conditions (i.e. alternative target condition values) for comparison with the base condition data (i.e. design condition values), open condition data (i.e. current condition values), and close condition data (i.e. target condition values) variables. The first step of the what-if construction process 100 is the initialization at step 101. Next, the what-if construction process 100 prompts the user to input the name of the what-if work sheet at step 102. At step 103 the what-if construction process 100 creates a new section data work sheet copying the section variables into the work sheet that are most likely to differ. The what-if section data variables include, but are not limited to, any of the variable defined in the open or closed section data variables configurations. At step 104, a new stage data work sheet is constructed using base section data variables copying the what-if stage variables into the work sheet. The what-if stage data variables include, but are not limited to, any of the variable defined in the open or closed stage data variables configurations. These what-if section data variables include variables that are most likely to differ from the design values. The what-if construction process 100 then constructs at step 105, a separate column for each stage in each group where the data for these variables may be entered by the user. The what-if construction process 100 then exits at step 109.

Figure 7:
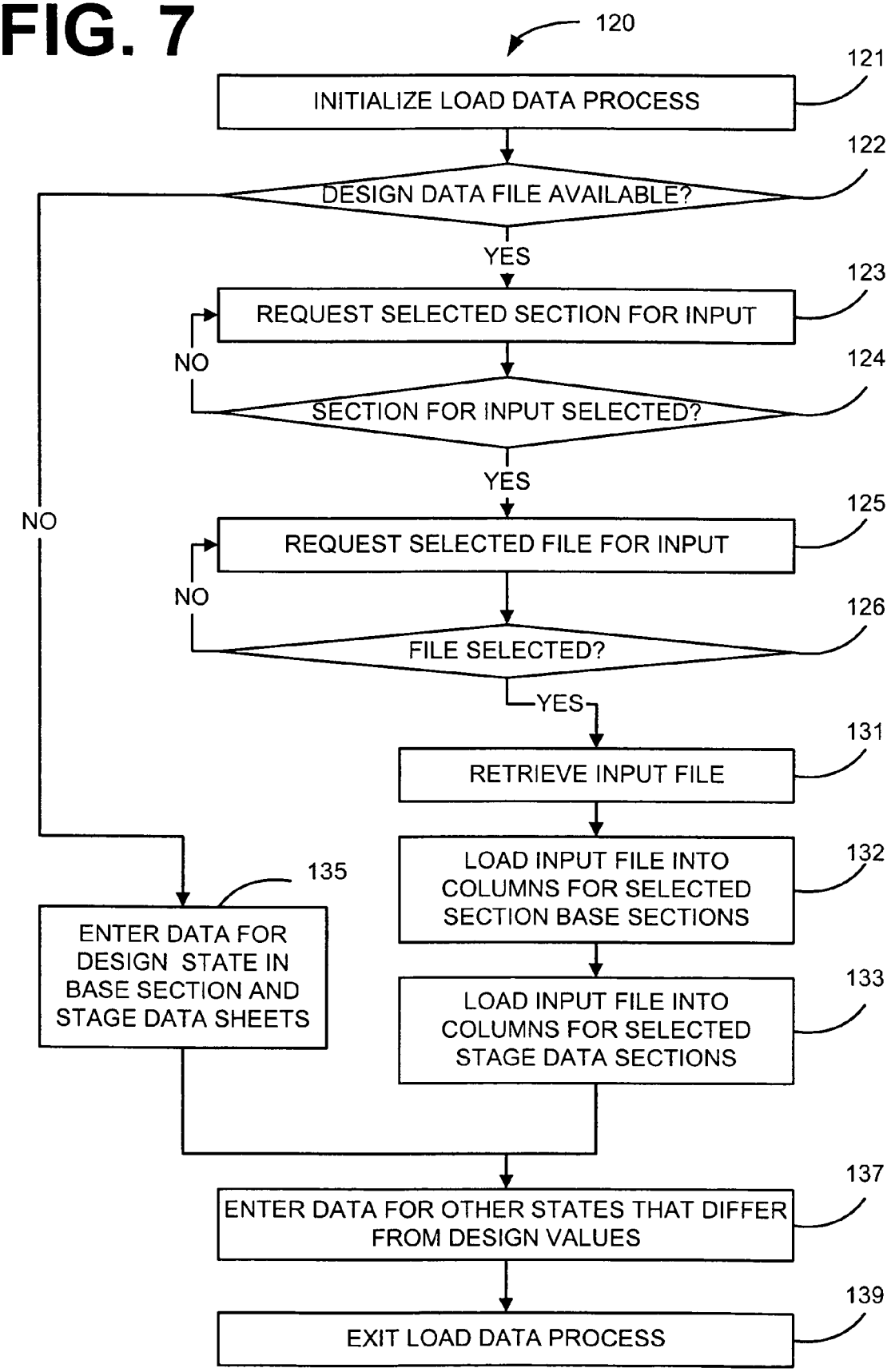
FIG. 7 is a flow chart of an example of a load data process used in the system and method for efficiency and cost analysis of the present invention, as shown in FIG. 2 and FIG. 3.

Illustrated in FIG. 7 is the load data process 120 that can be utilized in the efficiency and cost analysis system 50 of this disclosure. First the load data process 120 is initialized at step 121. At step 122, the load data process 120 determines whether a design data file is available. If it is determined at step 122 that a design data file is not available, the load data process 120 proceeds to step 135 and allows the user to enter data for the current design state into the base sections and stage data sheets. After entering the data for the design state at step 135, the load data process then proceeds to step 137.

If it is determined at step 122 that a design data file is available, the load data process 120 requests the user to indicate the selected section for input at step 123. Next, the load data process 120 makes a determination whether the section for input is indicated at step 124. If a section for input has not been indicated, the load data process 120 returns to request the selected section for input at step 123. If it is determined at step 124 that the section for input has been indicated, the load data process 120 then requests the selected file for input at step 125. At step 126, the load data process determines if a file was selected at step 125. If a file was not selected for input at step 125, the load data process 120 returns to repeat step 125.

If it is determined at step 126 that a file was selected, then the load data process 120 retrieves the selected input file at step 131. At step 132, the load data process loads the selected input file into columns in a worksheet for the selected base section and stage data sections. Each variable in the design input file is identified explicitly or implicity by a tag. These tags are associated with each variable on the section data sheet for overall input variables and on the stage data sheet for stage variables. The load data process 120 first processes the overall section variables and determines the correct row on the base section data sheet for each overall section variable read from the input file and then places the value from the input file into the selected row and the column corresponding to the current work group.

At step 133, the load data process 120 then processes each stage in the input file. The row for each stage variable read is found on the base stage data sheet. The corresponding value is copied to the selected row and the column associated with the current stage in the current work group on the base stage data sheet.

At step 137, the load data process 120 allows the user to enter data states that differ from the design values. After entering data for other states that differ from the design values, the load data process 120 then exits at step 139.

Figure 8:
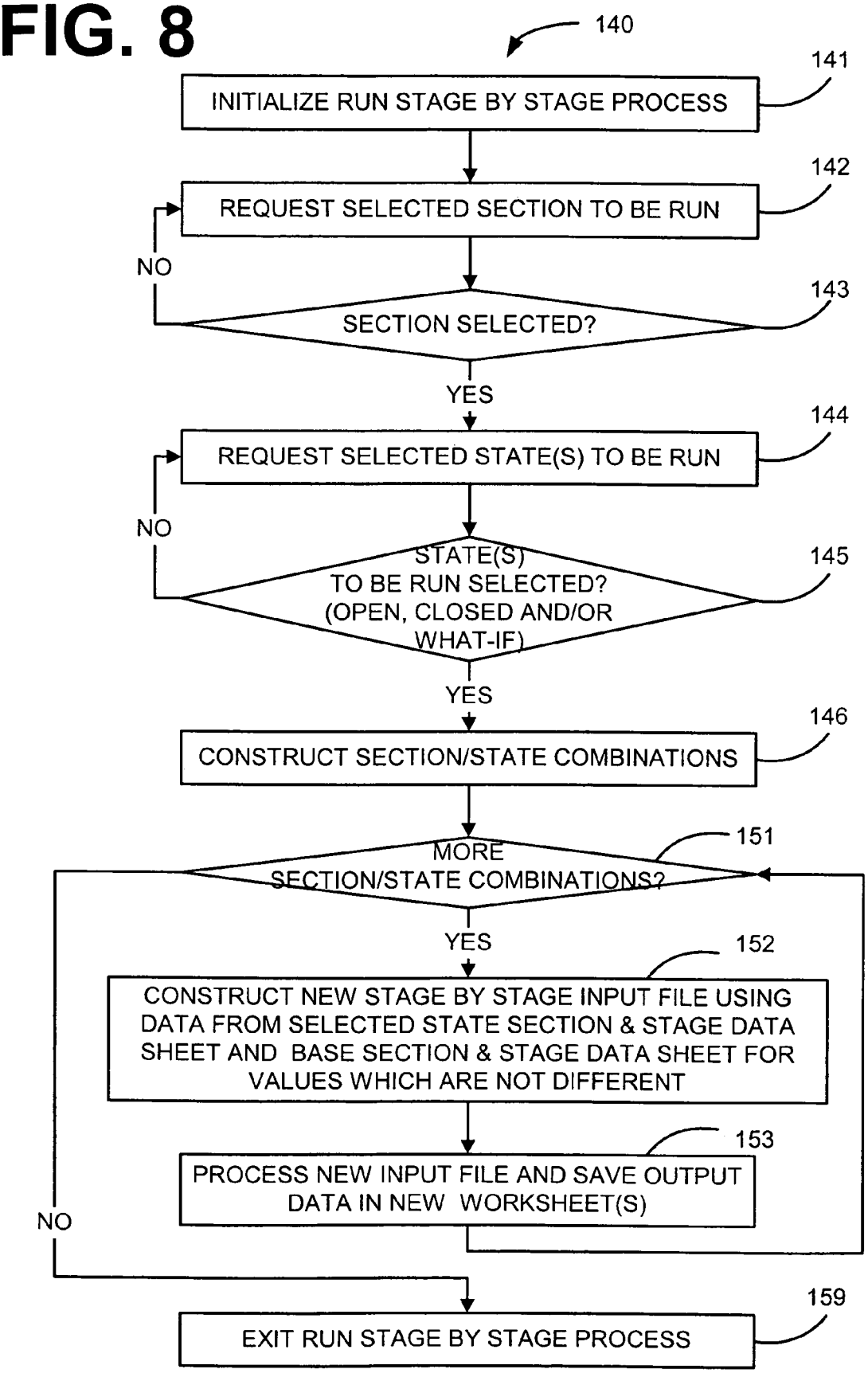
FIG. 8 is a flow chart of an example of the run stage by stage process in the system and method for efficiency and cost analysis of the present invention, as shown in FIG. 2 and FIG. 3.

Illustrated in FIG. 8 is the run stage by stage process 140 that can be utilized in the efficiency and cost analysis system 50 of this disclosure. The run stage by stage process 140 allows the user to indicate one or more section and state combinations to be constructed for later analysis. First, the run stage by stage process 140 is initialized at step 141. At step 142, the user is requested to select a section to be run. The user may select one or more sections (groups). At step 143, the run stage by stage process 140 determines whether the user has selected the requested section to be run at step 142. If it is determined that the user has not selected a requested section to be run, the run stage by stage process 140 returns to repeat step 142.

If it is determined at step 143 that the user has selected a section to be run, the run stage by stage process 140 then requests the user to select the state to be run at step 144. The states to select from include, but are not limited to, the base, open, closed, and all of the what-if condition cases constructed by the user. The user may select more than one state. At step 145, the run stage by stage process 140 determines whether a state to be run has been selected or whether more than one state is to be selected. If it is determined at step 145 that a state has not been selected or if more states are to be selected, the run stage by stage process 140 returns to repeat step 144.

If at step 145 it is determined that the user has selected a state to be run, the run stage by stage process then constructs the selected section and state combinations at step 146, by pairing every section selected with every state selected and selects the first combination.

At step 151, it is determined whether there are more section-state combinations to process in the stage by stage analysis. If it is determined at step 151 that there are no more section-state combinations to be run, the run stage by stage process 140 then exits at step 159.

If it is determined that there are more section-state combinations to be created, the run stage by stage process 140 then constructs the new stage by stage analysis input file or the current section state combination, at step 152. The new stage by stage analysis file is constructed by using data from the selected state section and stage data sheet and the base section and stage data sheet for values that are not different. Also at step 152, the run stage by stage process 140 first constructs the overall section variable section of the stage by stage analysis file by writing the tag for each non-blank variable followed by the value in the base section data sheet. Then if the current state is not the base state, and the variable is not blank on the current state section data worksheet, the tag is written to the analysis input file followed by the new value. This allows the stage by stage process 140 to override the value with the last value read from the analysis input file. Still at step 152, the run stage by stage process 140 then constructs the data input for each stage by writing the tags for each non-blank variable from the base stage data sheet followed by the value of the variable for the current section. Similarly, if the current state is not the base stage, and the variable is not blank on the current state stage data work sheet, the tag is written to the analysis input file followed by the new value.

The run stage by stage process 140 then processes the new input file at step 153. The stage by stage analysis output file is also processed to read the output variables (identified in FIG. 4) and store the output data in a new work sheet. The next section-state combination is selected. The run stage by stage process 140 then returns to repeat step 151.

Figure 9:
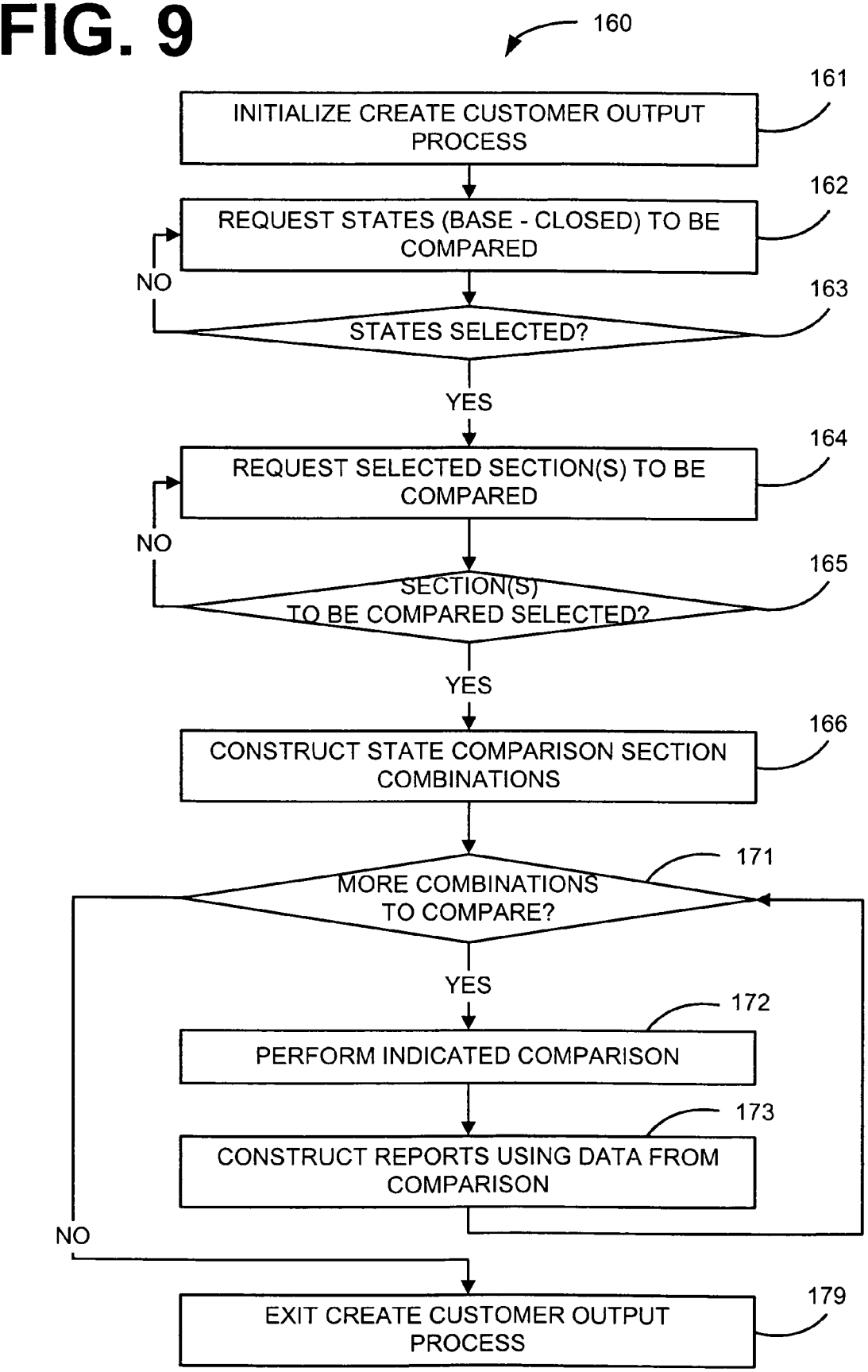
FIG. 9 is a flow chart of an example of the create customer output process in the system and method for efficiency and cost analysis of the present invention, as shown in FIG. 2 and FIG. 3.

Illustrated in FIG. 9 is the create customer output process 160 that can be utilized in the efficiency and cost analysis system 50 of this disclosure. The create customer output process 160 allows the user to select one or more comparison operations. In this particular instance, the comparisons made include, but are not limited to, section efficiency loss, unit kilowatt loss, heat rate loss and the cost of fuel due to the loss. In this example, these losses may be calculated for, but are not limited to, the nozzle, bucket, tip, root and shaft leakages, as well as other causes.

The create customer output process 160 is started by being initialized at step 161. At step 162, the create customer output process 160 requests the user to indicate the states to be compared. It is determined at step 163 whether the states to be compared have been selected. If it is determined at step 163 that the states to be compared have not been selected, the create customer output process 160 returns to repeat 162.

If it is determined at step 163 that the requested states to be compared were selected, the create customer output process 160 then requests the user to select the sections to be compared at step 164. It is determined at step 165 whether the requested sections to be compared were selected. If it is determined at step 165 that the sections to be compared were not selected, the create customer output process 160 returns to repeat step 164. If it is determined at step 165 that the sections to be compared were selected, the create customer output process 160 then constructs the state comparison section combinations at step 166.

At step 171, the create customer output process 160 determines whether there are more combinations to be compared. If it is determined at step 171 that there are no more combinations to be compared, the create customer output process 160 then exits at step 179.

However, if it is determined at step 171 that there are more combinations to be compared the create customer output process 160 then performs the indicated comparisons at step 172. The create customer output process 160 compares the output results from the two comparison states (e.g. base and close) for the selected section. The difference between the first and second states are calculated for selected output variables for each stage which measure performance. Then the values of interest such as, but not limited to, heat rate loss and the cost of fuel due to the loss, are calculated from the difference and the overall site variables entered in step 62 (FIG. 4). When all the stages have been calculated, the impact on the entire group (section) is calculated.

At step 173, the create customer output process 160 constructs the output reports using the data from the comparison performed at step 172. The output reports include tables summarizing the performance impact in terms of key values, such as, but not limited to, percent of section efficiency loss, heat rate loss, cost of fuel due to the loss for key parts of the section. Cost of fuel due to the loss of key parts includes, but is not limited to, nozzle, bucket, tip leakage, shaft leakage, root leakage and other losses. The next state-section combination is selected and the create customer output process 160 then returns to repeat step 171.

Figure 10:
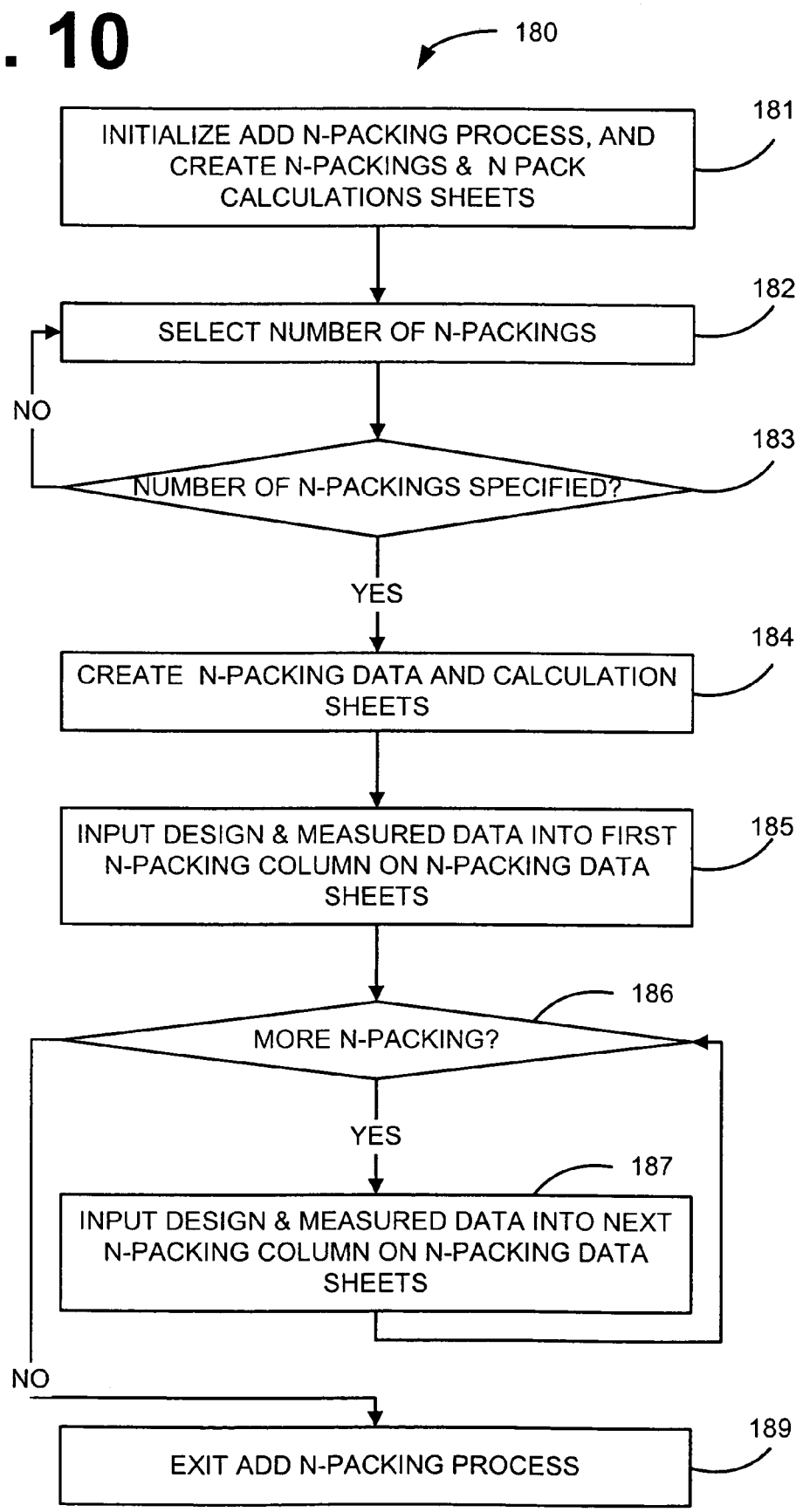
FIG. 10 is a flow chart illustrating an example of an add N-packing sheet process used in the system and method for efficiency and cost analysis of the present invention, as shown in FIG. 2 and FIG. 3.

Illustrated in FIG. 10 is the add N-packing process 180 that can be utilized in the efficiency and cost analysis system 50 of this disclosure. The add N-packing process 180 allows the user to define the number of N-packings to analyze and create requisite input data sheets for the analysis of the N-packings.

First, the add N-packing process 180 is initialized at step 181. At step 182, the add N-packing process 180 requests the user to select the number of N-packings to be processed. At step 183, the add N-packing process 180 determines whether a number of N-packings has been specified. If it is determined at step 183 that the number of N-packings has not been specified, the add N-packing process 180 returns to repeat step 182.

However, if it determined at step 183 that the number of N-packings has been specified, the add N-packing process 180 creates the N-packing data and calculation sheets at step 184. At step 185, the add N-packing process 180 starts with the first N-packing by having the user input the design and measure data into the first N-packing column on the N-packing data sheet at step 185. Next, it is determined at step 186 whether there are more N-packings to be processed. If it is determined at step 186 that there are no more N-packings to be processed, the add N-packing process 180 proceeds to exit at step 189. However, if it is determined at step 186 that there are more N-packings to be processed, the add N-packing process 180 then the user inputs the design and measure data into the next N-packing column on the N-packing data sheets. The add N-packing process 180 then returns to repeat step 186.

Figure 11:
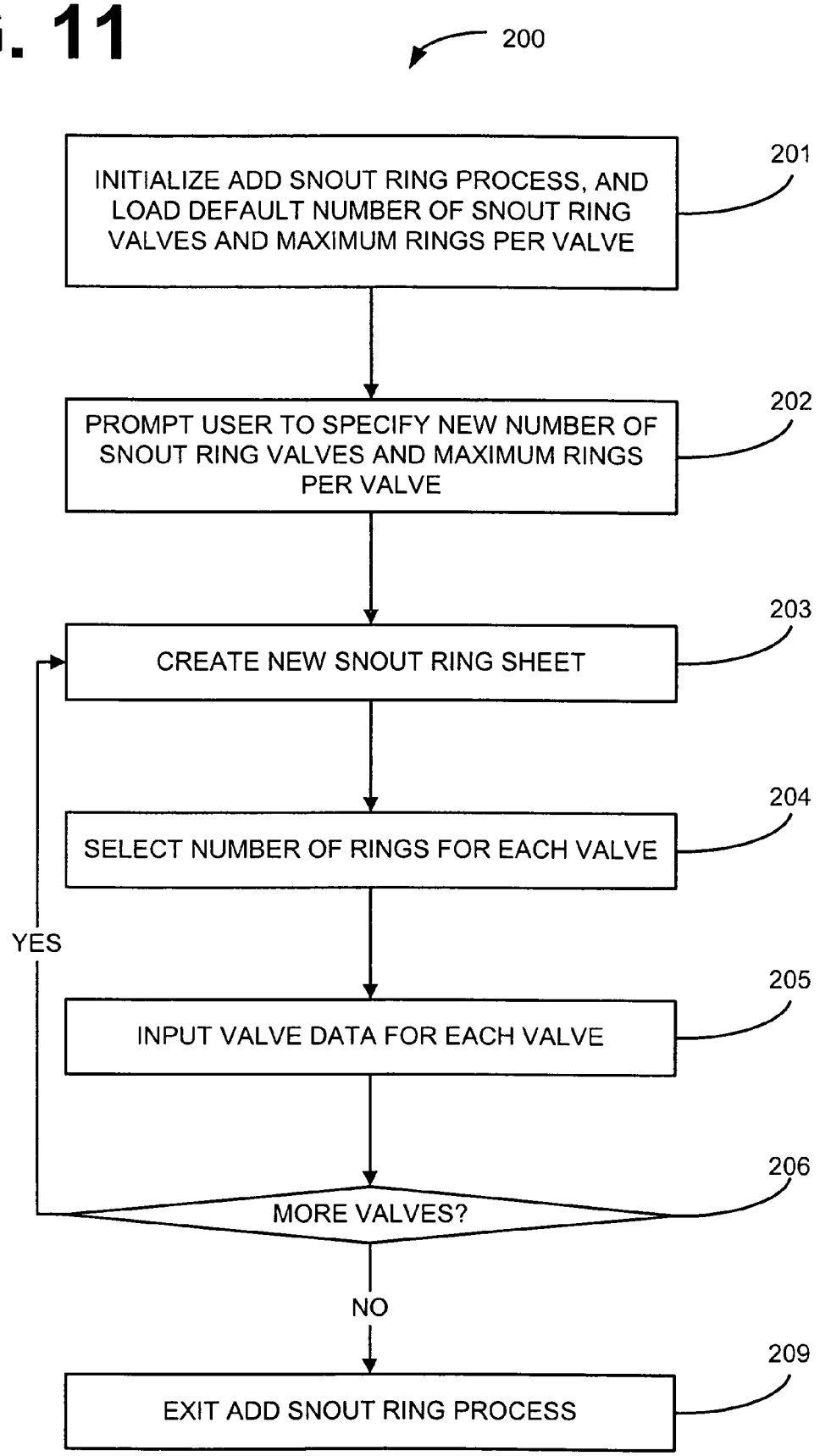
FIG. 11 is a flow chart of an example of the add snout ring sheet process in the system and method for efficiency and cost analysis of the present invention, as shown in FIG. 2 and FIG. 3.

Illustrated in FIG. 11 is the add snout ring process 200 that can be utilized in the efficiency and cost analysis system 50 of this disclosure. This process allows the user to enter data required for calculating the impact of the snout ring clearances on the flow efficiency. The number of valves and maximum number of allowed rings in each valve is established.

First, the add snout ring process 200 is initialized at step 201. Also at step 201, the add snout ring process 200 loads the default number of snout ring valves and maximum number of rings per valve. At step 202, the add snout ring process 200 prompts the user to specify a new number of snout ring valves and maximum rings per valve. If the user does not specify a new number of snout ring valves and maximum number of rings per valve at step 202, the add snout ring process 200 utilizes the default number of snout ring valves and maximum number of rings per valve established during initialization.

At step 203, the add snout ring process 200 creates a new snout ring sheet. The maximum number of rings per valve defined during step 201 is used to define the row sections and setup the data on the snout ring sheet. At step 204, the number of rings for each valve is selected. Any unused ring sections are blacked out to prevent inadvertent data entry. At step 205 the input valve data for each valve is input. At step 206, the add snout ring process 200 determines whether there are more snout ring valves to be processed. If it is determined at step 206 that there are more snout ring valves to be processed, the add snout ring process 200 returns to repeat step 203 through 206. However, if it determined at step 206 that there no more snout ring valves to be processed, the add snout ring process 200 then exits at step 209.

Figure 12A:
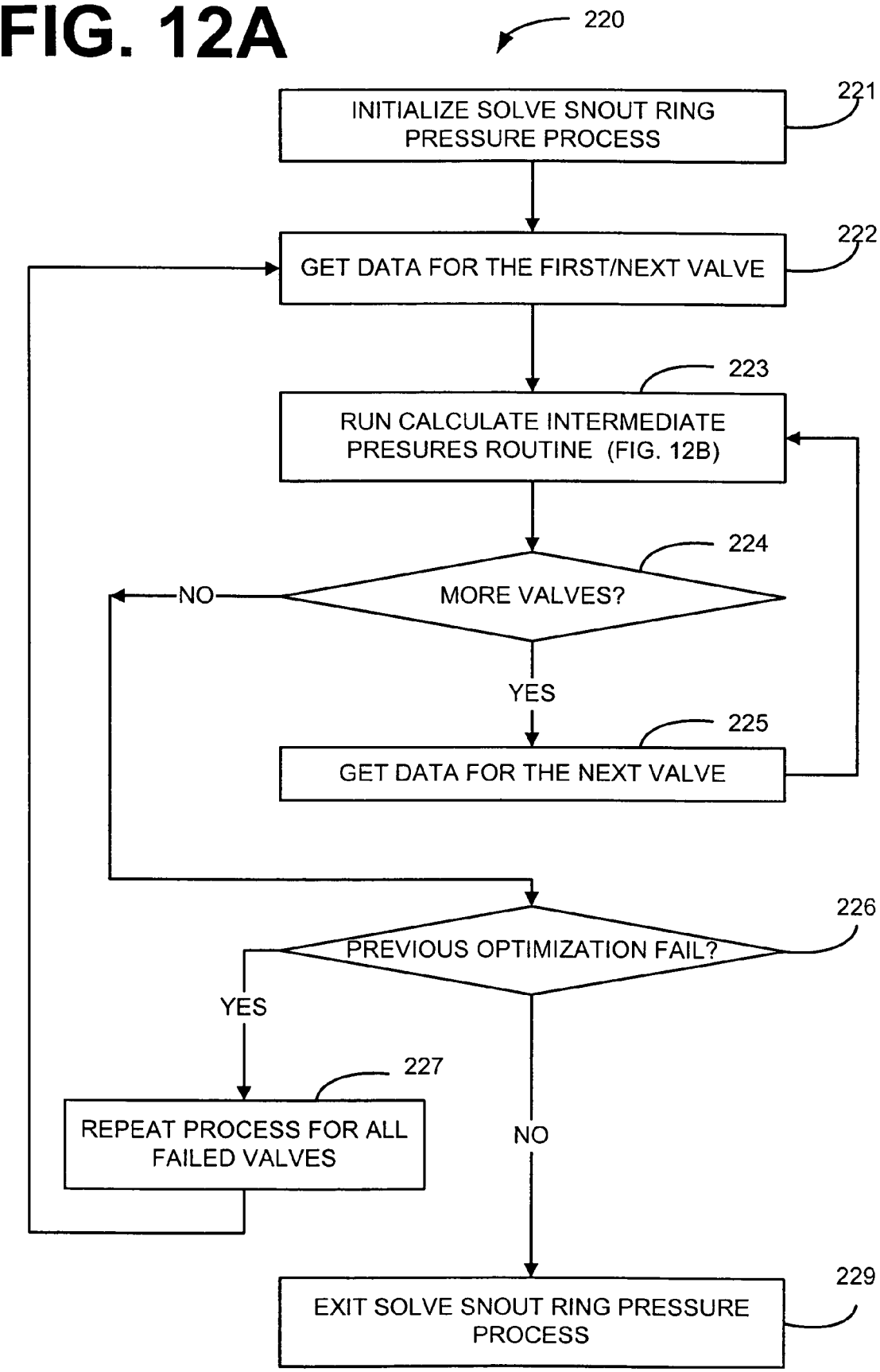
FIGS. 12A and 12B are flow charts of an example of the solve snout ring pressure process used in the system and method for efficiency and cost analysis of the present invention, as shown in FIG. 2 and FIG. 3.
Figure 12B:
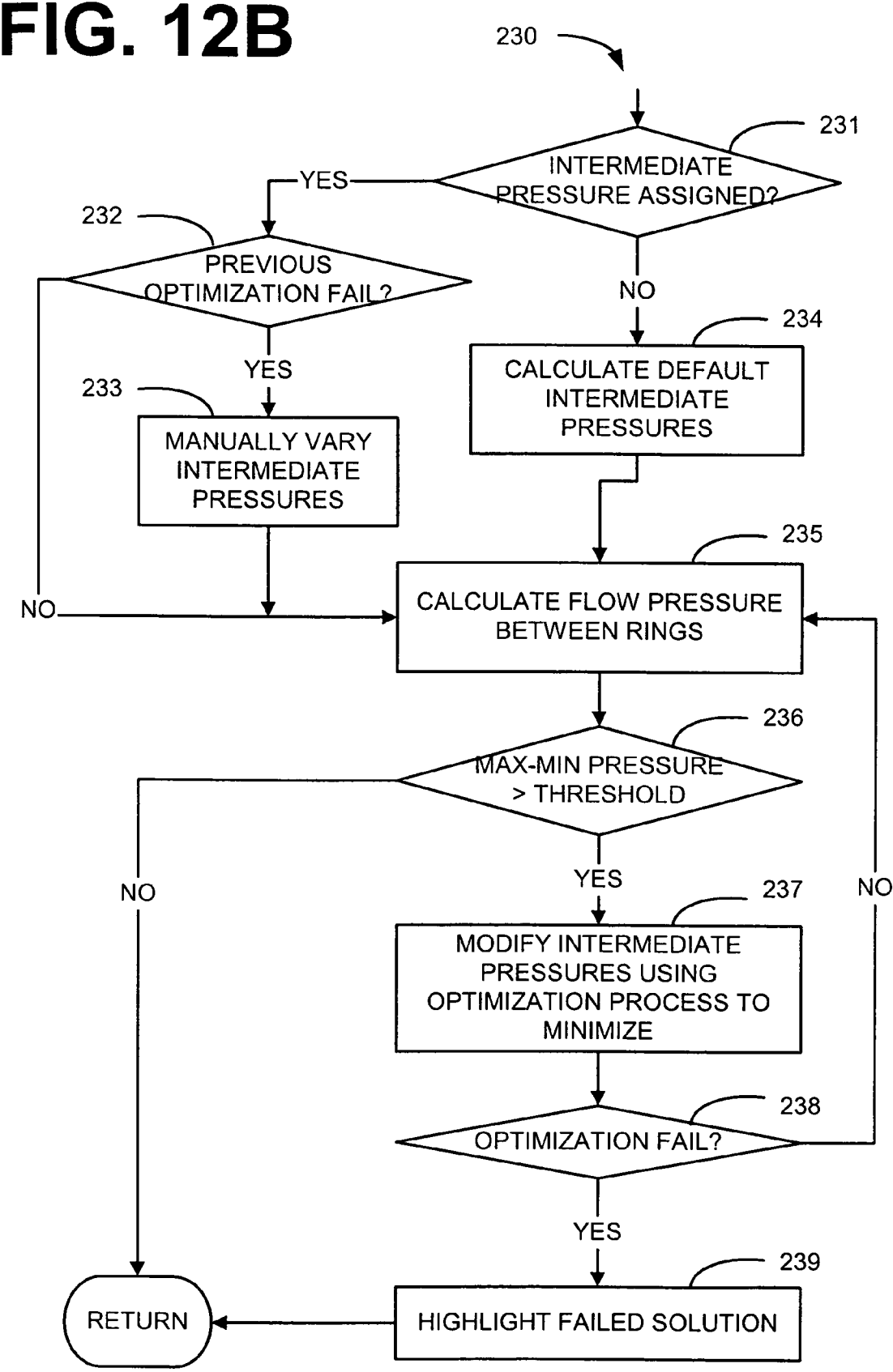

Illustrated in FIGS. 12A and 12B is the solve snout ring pressure process 220 that can be utilized in the efficiency and cost analysis system 50 of this disclosure. FIG. 12A illustrates an example of the higher level solve snout ring pressure process 220 and FIG. 12B illustrates an example of the calculate intermediate pressures routine utilized in the solve snout ring pressure process 220. First, the solve snout pressure process 220 initializes at step 221. At step 222, the solve snout ring pressure process 220 gets the data for the first/next valves to be processed.

At step 223, the solve snout ring pressure process 220 then runs the calculate intermediate pressure routine 230 to calculate and optimize the intermediate pressures. The calculate intermediate pressures routine 230 is herein described in further detail with regard to FIG. 12B.

After running the calculate intermediate pressures routine 230, the solve snout ring pressure process 220 then determines whether there are more valves to be processed at step 224. If it is determined at step 224 that there are more valves to be processed, the solve snout ring pressure process 220 gets the data for the next valve at step 225 and returns to repeat step 223.

If it is determined at step 224 that there are no more valves to calculate the intermediate pressure for in the solve snout ring pressure process 220, the solve snout ring pressure process 220 then proceeds to determine if any of the previous optimizations failed at step 226. Optimization failure occurs when the optimization did not reach a satisfactory conclusion. If it is determined at step 226 that any of the previous optimizations failed, the solve snout ring pressure process 220 then identifies all the failed valves and returns to repeat steps 222 through 226 for the failed valves. However, if it is determined at step 226 that none of the previous optimizations failed, the solve snout ring pressure process 220 exits at step 229.

Illustrated in FIG. 12(B) is the calculate intermediate pressure routine 230. First, the calculate intermediate pressure routine 230 determines whether an intermediate pressure has been assigned at step 231. If it is determined at step 231 that the intermediate pressure was not assigned, the calculate intermediate pressure routine 230 then calculates the default-intermediate pressures at step 234. The intermediate pressures are calculated using linear interpolation between the starting and ending pressure values previously input by the user at step 131 (FIG. 7) and proceeds to step 235.

However, if it is determined at step 231 that an intermediate pressure has been assigned, the calculate intermediate pressure routine 230 then determines whether the previous optimization failed at step 232. If it is determined at step 232 that the previous optimization did not fail, the calculate intermediate pressure routine 230 then proceeds to step 235. However, if it is determined at step 232 that the previous optimization did fail, the calculate intermediate pressure routine 230 then prompts the user to manually vary the intermediate pressures to provide a new starting point for the optimization process at step 233.

At step 235, the calculate intermediate pressure routine 230 calculates the flow rate between the current rings. Next, at step 236 it is determined whether the difference between the maximum and minimum calculated flow rate between the rings is greater than the threshold. If it is determined at step 236 that the difference in flow is not greater than the threshold, the calculate intermediate pressure routine 230 then returns to step 224 (FIG. 12A).

However, if it is determined at step 236 that the calculated flow rate is greater than the threshold, the calculate intermediate pressure routine 230 then modifies the intermediate pressures utilizing any well-known optimization technique to minimize the difference in flow rates calculated from the pressures at step 237. Next, at step 238, the calculate intermediate pressure routine 230 determines whether the current optimization iteration has failed to find a solution with the difference less than the given threshold within a predetermined iteration limit at step 238. If the optimization has not failed, the calculate intermediate pressures routine 230 increases the number of optimization iterations and then returns to repeat step 235. If it is determined at step 238 that the optimization iteration did fail, the calculate intermediate pressures routine 230 then highlights the failed solution at step 239 and returns to step 224 (FIG. 12A).

Figure 13:
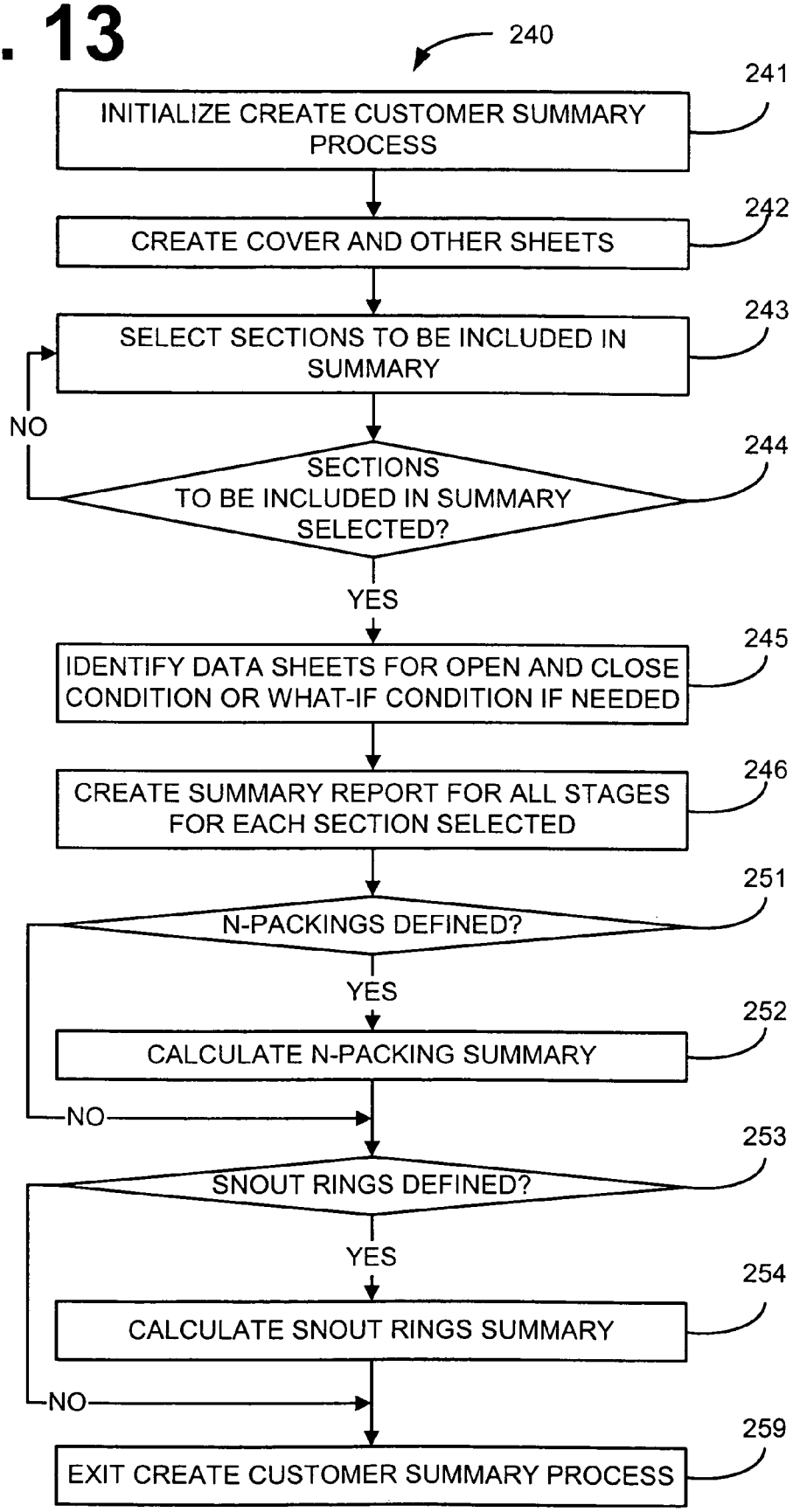
FIG. 13 is a flow chart of an example of the create customer summary process in the system and method for efficiency and cost analysis of the present invention, as shown in FIG. 2 and FIG. 3.

Illustrated in FIG. 13 is the create customer summary process 240 that can be utilized in the efficiency and cost analysis system 50 of this disclosure. First, the create customer summary process 240 is initialized at step 241. Next, the cover and other sheets which summarize the N-Packing and Snout Ring results are created at step 242. At step 243, the create customer summary process 240 prompts the user to select the sections to be included in the summary. At step 244, the create customer summary process 240 determines whether the sections to be included in the summary have been selected. If it is determined at step 244 that the sections to be included in the summary have not been selected, the create customer summary process 240 then returns to repeat step 243.

However, if it is determined at step 244 that the sections to be included in the summary have been selected, the create customer summary process 240 then allows the user to identify which sheets represent the open and close conditions. Normally, these will default to the open and close conditions, but the user may select other conditions if they have performed what-if analysis (particularly to represent alternative closing conditions as a result of different maintenance operations performed). Next, at step 246, a customer summary report is created for all stages for each section selected by selecting the totals from the comparison sheets for the section and conditions and copying them to the Summary Sheet.

The create customer summary process 240 then determines whether the N-packings are defined at step 251. The N-Packings are not defined if the user has not constructed the N-Packing sheet through performing the add N-Packing sheet process 180 (FIG. 10). If it is determined at step 251 that the N-packings are not defined, the create customer summary process 240 then skips to step 253. However, if it is determined at step 251 that the N-packings are defined, the create customer summary process 240 then calculates the N-packing packing summary at step 252 by selecting the calculated impact on efficiency from the N-Packing sheet for each N-Packing (column) defined. The total impact for N-Packings is then summed and copied to the Summary Sheet.

At step 253, the create customer summary process 240 then determines whether the snout rings are defined. If the snout rings are not defined, the create customer summary process 240 then proceeds to exit at step 259. The Snout Rings are not defined if the user has not constructed the Snout Ring sheet through create snout ring sheet process 200 (FIG. 11) and solve snout ring pressure process 220 in (FIG. 12). However, if it is determined at step 253 that the snout rings are defined, the create customer summary process 240 then calculates the snout ring summaries at step 254 by selecting the calculated impact on efficiency from the Snout Ring sheet for each valve defined. The total impact from the Snout Rings is summed and copied to the Summary Sheet. The create customer summary process 240 then exits at step 259.

Figure 14:
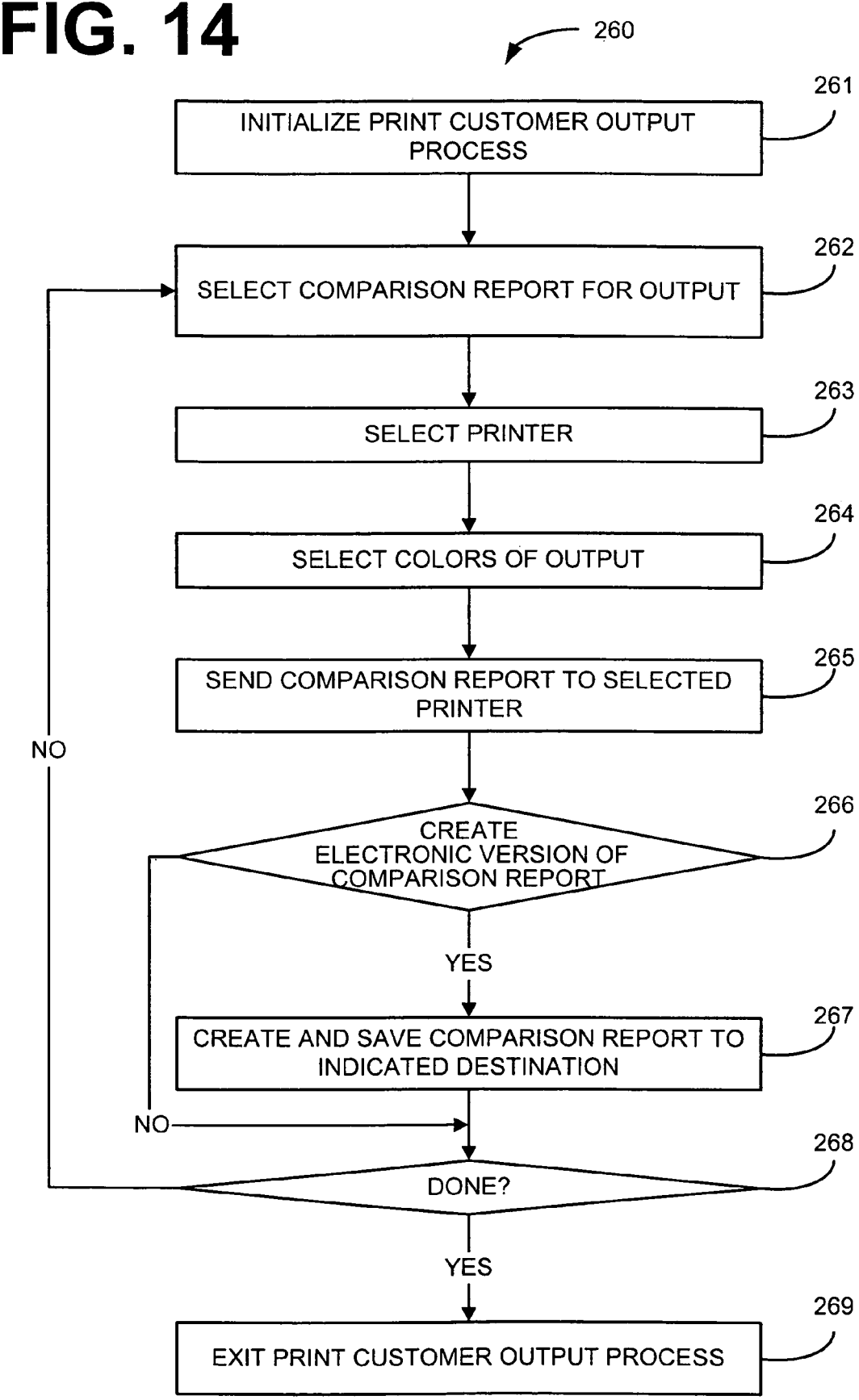
FIG. 14 is a flow chart of an example of the print customer output process in the system and method for efficiency and cost analysis of the present invention as shown in FIG. 2 and FIG. 3.

Illustrated in FIG. 14 is the print customer output process 260 that can be utilized in the efficiency and cost analysis system 50 of this disclosure. First, the print customer output process 260 is initialized at step 261. At step 262, the print customer output process 260 prompts the user the select the comparison report for output. At step 263 and 264, the print customer output process 260 prompts the user to select the printer and the colors for the comparison report. The user selects the option for color, or black and white printing for the comparison report to be output. At step 265, the print customer output process 260 sends a comparison report to the printer selected at step 263.

At step 266, it is determined whether the user wishes to create an electronic version of the comparison report. If it is determined that the user does not wish to create an electronic version of the comparison report, the print customer output process 260 then skips to step 268 to determine whether there are more comparison reports to be output. However, if it is determined at step 266 that the user wishes to create an electronic version of the comparison report, the print customer output process 260 creates and saves an electronic version of the comparison report to an indicated destination at step 267.

At step 268, the print customer output process 260 determines whether there are more comparison reports to be output. If it is determined at step 268 that there are more comparison reports to be output, the print customer output process 260 returns to repeat steps 262 through 268. However, if it is determined at step 268 that there are no more comparison reports to be output, the print customer output process 260 then exits at step 269.

Figure 15:
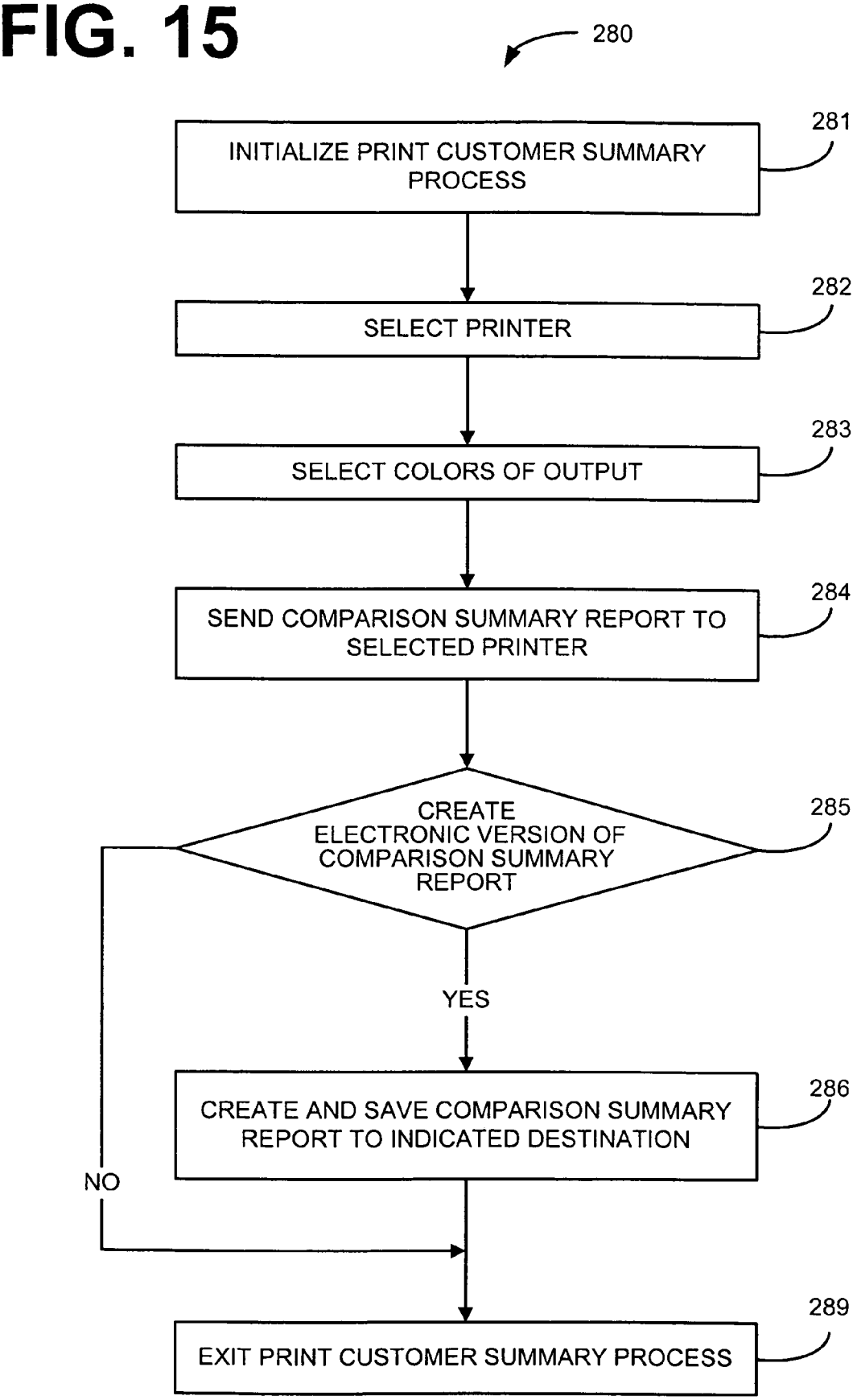
FIG. 15 is a flow chart of an example of the print customer summary process in the system and method for efficiency and cost analysis of the present invention, as shown in FIG. 2 and FIG. 3.

Illustrated in FIG. 15 is a print customer summary process 280 that can be utilized in the efficiency and cost analysis system 50 of this disclosure. First, the print customer summary process 280 is initialized at step 281. At step 282 and 283, the user is prompted to select the printer and the colors that the comparison summary report is to be output. At step 284, the print customer summary process 280 then sends the comparison summary report to the selected printer.

At step 285, it is determined whether the user wishes to create an electronic version of the comparison summary report. If it is determined that the user does not wish to create an electronic version of the comparison summary report, the print customer summary process 280 then exits at step 289. However, if it is determined at step 285 that the user does wish to create an electronic version of the comparison summary report, the print customer summary process 280 creates and saves the electronic version of the comparison summary report to an indicated location at step 286. The print customer summary process 280 then exits at step 289.

The efficiency and cost analysis system and method 50 comprises an ordered listing of executable instructions for implementing logical functions. The ordered listing can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate, or transport the program for use by or in connection with the instruction execution system, apparatus, or device.

The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The flow charts of this disclosure show the architecture, functionality, and operation of a possible implementation of the register usage optimization compilation and translation system. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

The system and methods discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing efficiency and cost analysis for a power generation unit comprising the steps of:
   acquiring a plurality of current condition variables for said power generation unit;
   acquiring a plurality of alternative target operation variables, including open or closed turbine stage variables, for said power generation unit;
   acquiring a plurality of design constants for said power generation unit; and
   calculating operational efficiency of said power generation unit based upon said plurality of current condition variables, said plurality of alternative target operation variables and said plurality of design constants.

2. The method of claim 1, wherein said step of acquiring a plurality of current condition variables further comprises:
   acquiring a plurality of stage operation variables for said power generation unit; and
   wherein said step of acquiring a plurality of design constants further comprises:
   acquiring a plurality of stage design constants for said power generation unit.

3. The method of claim 2, wherein said step of calculating operational efficiency of said power generation unit further comprises:
   calculating operational efficiency between each stage of said plurality of stage operation variables of said power generation unit; and calculating operational efficiency between each stage of said plurality of stage design constants of said power generation unit.

4. The method of claim 3, wherein said step of acquiring a plurality of alternative target operation variables further comprises:
   acquiring a plurality of stage alternative target operation variables for said power generation unit.

5. The method of claim 4, wherein said step of calculating operational efficiency of said power generation unit further comprises:
   calculating operational efficiency between each stage of said plurality of stage alternative target operation variables of said power generation unit.

6. The method of claim 5, further comprising the step of:
   calculating a plurality of optimization variables to associate increased efficiency of said power generation unit with maintenance cost to achieve said increased efficiency; and
   generating a report indicating a plurality of optimization variables for said power generation unit.

7. A system for providing efficiency and cost analysis for a power generation unit comprising:
   means for acquiring a plurality of current condition variables for said power generation unit;
   means for acquiring a plurality of alternative target operation variables, including open or closed turbine stage variables for said power generation unit;
   means for acquiring a plurality of design constants for said power generation unit; and
   means for calculating operational efficiency of said power generation unit based upon said plurality of current condition variables, said plurality of alternative target operation variables and said plurality of design constants.

8. The system of claim 7, further comprising:
   means for acquiring a plurality of stage operation variables for said power generation unit; and
   means for acquiring a plurality of stage design constants for said power generation unit.

9. The system of claim 8, wherein said calculating operational efficiency means further comprises:
   means for calculating operational efficiency between each stage of said plurality of stage operation variables of said power generation unit; and
   means for calculating operational efficiency between each stage of said plurality of stage design constants of said power generation unit.

10. The system of claim 9, wherein said acquiring a plurality of alternative target operation variables means further comprises:
    means for acquiring a plurality of stage alternative target operation variables for said power generation unit.

11. The system of claim 10, wherein said calculating operational efficiency means further comprises:
    means for calculating operational efficiency between each stage of said plurality of stage alternative target operation variables of said power generation unit.

12. The system of claim 11, further comprising:
    means for calculating a plurality of optimization variables to associate increased efficiency of said power generation unit with maintenance cost to achieve said increased efficiency; and
    means for generating a report indicating a plurality of optimization variables for said power generation unit.

13. A system for providing efficiency and cost analysis for a power generation unit comprising:
    current condition data acquisition logic that acquires a plurality of current condition variables for said power generation unit;
    alternative target operation variables logic that acquires a plurality of stage operation variables, including open or closed turbine stage variables, for said power generation unit;
    design constants acquisition logic that acquires a plurality of design constants for said power generation unit; and
    analysis logic that calculates a operational efficiency of said power generation unit based upon said plurality of current condition variables, said plurality of alternative target operation variables and said plurality of design constants.

14. The system of claim 13, wherein said analysis logic further comprises:
    stage operation calculating logic that calculates operational efficiency between each stage of said plurality of stage operation variables of said power generation unit; and
    stage design calculating logic that calculates operational efficiency between each stage of said plurality of stage design constants of said power generation unit.

15. The system of claim 14, further comprising:
    target operation acquisition logic that acquires a plurality of alternative target operation variables for said power generation unit.

16. The system of claim 15, further comprising:
    stage target acquisition logic that acquires a plurality of stage alternative target operation variables for said power generation unit.

17. The system of claim 16, wherein said analysis logic further comprises:
    stage target calculating logic that calculates operational efficiency between each stage of said plurality of stage alternative target operation variables of said power generation unit.

18. The system of claim 17, further comprises:
    optimization calculating logic that calculates a plurality of optimization variables to associate increased efficiency of said power generation unit with maintenance cost to achieve said increased efficiency; and report generating logic that generates a report indicating a plurality of optimization variables for said power generation unit.

19. A computer readable recording medium having a program providing efficiency and cost analysis for a power generation unit, said program comprising:

means for acquiring a plurality of current condition variables for said power generation unit;

means for acquiring a plurality of alternative target operation variables, including open or closed turbine stage variables, for said power generation unit;

means for acquiring a plurality of design constants for said power generation unit; and means for calculating operational efficiency of said power generation unit based upon said plurality of current condition variables, said plurality of alternative target operation variables and said plurality of design constants.

20. The computer readable medium of claim 19, further comprising:

a third routine means for calculating operational efficiency between each stage of said plurality of stage operation variables of said power generation unit; and a fourth routine means for calculating operational efficiency between each stage of said plurality of stage design constants of said power generation unit.

21. The computer readable medium of claim 20, further comprising:

a fifth routine means for acquiring a plurality of alternative target operation variables for said power generation unit; and a sixth routine means for acquiring a plurality of stage alternative target operation variables for said power generation unit.

22. The computer readable medium of claim 21, further comprising:

a seventh routine means for calculating a plurality of optimization variables to associate increased efficiency of said power generation unit with maintenance cost to achieve said increased efficiency; and an eighth routine means for generating a report indicating a plurality of optimization variables for said power generation unit.

* * * * *